United States Patent
Hiramoto (10) Patent No.: US 7,036,009 B2
(45) Date of Patent: Apr. 25, 2006

(54) PARTITION RECONFIGURATION SYSTEM, PARTITION RECONFIGURATION METHOD, AND PARTITION RECONFIGURATION PROGRAM

(75) Inventor: Mitsuhiro Hiramoto, Tokyo (JP)

(73) Assignee: NEC Corporation, Tokyo (JP)

( * ) Notice: Subject to any disclaimer, the term of this patent is extended or adjusted under 35 U.S.C. 154(b) by 390 days.

(21) Appl. No.: 10/227,949

(22) Filed: Aug. 27, 2002

(65) Prior Publication Data
US 2003/0046531 A1    Mar. 6, 2003

(30) Foreign Application Priority Data
Aug. 30, 2001   (JP)   ............................. 2001-261022

(51) Int. Cl.
*G06F 9/00*   (2006.01)

(52) U.S. Cl. .......................... 713/100; 713/1
(58) Field of Classification Search ................. 713/100
See application file for complete search history.

(56) References Cited

U.S. PATENT DOCUMENTS

| | | | | |
|---|---|---|---|---|
| 3,787,816 A | * | 1/1974 | Hauck et al. | 714/3 |
| 3,812,468 A | * | 5/1974 | Wolllum et al. | 714/4 |
| 3,812,469 A | * | 5/1974 | Hauck et al. | 710/100 |
| 5,790,817 A | * | 8/1998 | Asghar et al. | 710/311 |
| 6,804,790 B1 | * | 10/2004 | Rhee et al. | 713/320 |

* cited by examiner

*Primary Examiner*—John R. Cottingham
(74) *Attorney, Agent, or Firm*—Young & Thompson (57) ABSTRACT

A partition reconfiguration system includes a management node that issues a partition reconfiguration instruction based on pre-defined schedule information; an operating system that, in response to the instruction, changes an operation state thereof to a partition re-configurable state in which a usual operation state is stopped to make reconfiguration possible and, at the same time, notifies that the operation state thereof has been changed, the operating system operating on a computer system; and a service processor that, in response to the notification notifying that the operation state has been changed, configures a partition according to information on components constituting the partition included in the instruction and, at the same time, changes the operation state of the operating system to the usual operation state.

6 Claims, 11 Drawing Sheets

| DATE/TIME INFORMATION | PARTITION NUMBER | COMPONENT INFORMATION |
|---|---|---|
| . . | . . | . . |
| 2000/03/20,Mon,21:00 | 50 | CPU BOARD 10,11:<br>INPUT/OUTPUT CONTROLLER 20,21:<br>EXTERNAL STORAGE DEVICE 30,31 |
| 2000/03/20,Mon,21:00 | 51 | CPU BOARD 12 :<br>INPUT/OUTPUT CONTROLLER 22:<br>EXTERNAL STORAGE DEVICE 32 |
| . . | . . | . . |

| DATE/TIME | PARTITION NO. | COMPONENT INFORMATION | LOAD STATUS HISTORY INFORMATION |
|---|---|---|---|
| . . | . . | . . | . . |
| 2000/03/20,Mon,21:00 | 80 | CPU BOARD 40,41: INPUT/OUTPUT CONTROLLER 50,51: EXTERNAL STORAGE DEVICE 70 | CPU95%,I/O20% |
| . . | . . | . . | . . |
| 2000/03/21,Tue,7:00 | 80 | CPU BOARD 40: INPUT/OUTPUT CONTROLLER 50,51: EXTERNAL STORAGE DEVICE 70,71 | CPU60%,I/O70% |
| . . | . . | . . | . . |
| 2000/03/27,Mon,21:00 | 80 | CPU BOARD 40,41: INPUT/OUTPUT CONTROLLER 50,51: EXTERNAL STORAGE DEVICE 70 | |
| . . | . . | . . | . . |
| . . | . . | . . | . . |
| . . | . . | . . | . . |
| | | | |

PARTITION RECONFIGURATION SYSTEM, PARTITION RECONFIGURATION METHOD, AND PARTITION RECONFIGURATION PROGRAM

BACKGROUND OF THE INVENTION

1. Field of the Invention

The present invention relates to a partition reconfiguration system, a partition reconfiguration method, and a partition reconfiguration program, and more particularly to a partition reconfiguration system, a partition reconfiguration method, and a partition reconfiguration program that automatically change the configuration of partitions to efficiently use computer resources.

2. Description of the Related Art

A plurality of logical divisions of a computer system composed of CPU boards, input/output controllers, and external storage devices are called partitions.

Partitions are already known according to the prior art, including what is described in the Japanese Patent Application Laid-open No. Hei 3-69740.

The partitions that are originally set up are used permanently in most cases, and it has been quite uncommon that a system manager reconfigures the partitions as necessary.

However, the conventional partition reconfiguration system has the problems described below.

A first problem is that it is very difficult to efficiently use computer resources such as the CPU boards, input/output controllers, and external storage devices that are the components of a partition. In a computer system with a fixed partition configuration in which the operation mode changes according to time zones, the usage rate of the computer resources, such as the CPU boards, input/output controllers, and external storage devices that are the components of a partition, is low except at a load peak time but is high at a load peak time. From the viewpoint of whole system, this prevents the computer resources from being used efficiently. More specifically, online applications and batch applications are sometimes processed concurrently in separate partitions. Normally, in the daytime during which much online application processing is executed, the load of the computer resources of a partition allocated to online applications is heavy but the load of computer resources of a partition allocated to batch processing is light. On the other hand, at night during which much batch application processing is executed, the load of computer resources of a partition allocated to batch applications is heavy but the load of computer resources of a partition allocated to online applications is light. In a computer system where such an operation mode is used, a function that efficiently reconfigures the partitions is desired.

A second problem is that the partition reconfiguration operation is tiresome. The system manager is usually responsible for reconfiguring the originally set-up partitions when such a need arises. Because day-to-day operations are executed in the daytime, the partition reconfiguration operation must be done at night or on holidays. This increases the load of the system manager.

SUMMARY AND OBJECTS OF THE INVENTION

It is an object of the present invention to provide a partition reconfiguration system that automatically reconfigures the partitions to increase the efficiency of computer resources.

A first partition reconfiguration system according to the present invention partitions components constituting a computer system based on pre-defined schedule information.

A second partition reconfiguration system according to the present invention, which is a system in accordance with the first partition reconfiguration system, comprises a management node that issues a partition reconfiguration instruction based on the pre-defined schedule information; an operating system that, in response to the instruction, changes an operation state thereof to a partition re-configurable state in which a usual operation state is stopped to make reconfiguration possible and, at the same time, notifies that the operation state thereof has been changed, the operating system operating on the computer system; and a service processor that, in response to the notification notifying that the operation state has been changed, configures a partition according to information on components constituting the partition included in the instruction and, at the same time, changes the operation state of the operating system to the usual operation state.

A third partition reconfiguration system according to the present invention, which is a system in accordance with the second partition reconfiguration system, further comprises partition reconfiguration schedule means for including at least date/time information indicating a date and time on which each partition is to be reconfigured and component information indicating information on components constituting the partition, wherein the management node periodically obtains the date/time information and the component information from the partition reconfiguration schedule means, compares the obtained date/time information with a current date/time, judges that a partition should be reconfigured if there is a matching date/time entry, and issues a partition reconfiguration instruction based on the corresponding component information.

A fourth partition reconfiguration system according to the present invention is a system in accordance with the third partition reconfiguration system, wherein the partition reconfiguration schedule means further includes load information including at least information on a CPU usage rate and an I/O load for each partition configuration, the load information being collected from the operating system after reconfiguration, and wherein the management node periodically obtains the date/time information and the component information from the partition reconfiguration schedule means, compares the obtained date/time information with the current date/time, judges that a partition should be reconfigured if there is a matching entry and, after adding components to the components indicated by the component information if the load information on a partition, whose component information is the same or similar to the component information on the partition to be reconfigured, indicates a heavy load or after reducing components from the components included in the component information if the load information indicates a light load, issues the partition reconfiguration instruction.

A first partition reconfiguration method according to the present invention partitions components constituting a computer system based on pre-defined schedule information.

A second partition reconfiguration method according to the present invention, which is a method in accordance with the first partition reconfiguration method, comprises the steps of issuing a partition reconfiguration instruction based on the pre-defined schedule information; and, in response to a notification from an operating system notifying that an operation state thereof has been changed to a partition re-configurable state in which a usual operation state is stopped to make reconfiguration possible, configuring a partition according to information on components constituting the partition included in the instruction and, at the same time, changing the operation state of the operating system to the usual operation state.

A third partition reconfiguration method according to the present invention is a method in accordance with the second partition reconfiguration method, wherein the step of issuing a partition reconfiguration instruction comprises the steps of periodically obtaining, from partition reconfiguration schedule means for including at least date/time information indicating a date and time on which each partition is to be reconfigured and component information indicating information on components constituting the partition, the date/time information and the component information; comparing the obtained date/time information with a current date/time and judging that a partition should be reconfigured if there is a matching date/time entry; and issuing a partition reconfiguration instruction based on the corresponding component information.

A fourth partition reconfiguration method according to the present invention is a method in accordance with the third partition reconfiguration method, wherein the step of issuing a partition reconfiguration instruction comprises the steps of periodically obtaining the date/time information and the component information from the partition reconfiguration schedule means that further includes load information including at least information on a CPU usage rate and an I/O load for each partition configuration, the load information being collected from the operating system after reconfiguration; comparing the obtained date/time information with the current date/time and judging that a partition should be reconfigured if there is a matching entry; and issuing the partition reconfiguration instruction after adding components to the components indicated by the component information if the load information on a partition, whose component information is the same or similar to the component information on the partition to be reconfigured, indicates a heavy load or after reducing components from the components included in the component information if the load information indicates a light load.

A first program according to the present invention causes a computer to partition components constituting a computer system based on pre-defined schedule information.

A second program according to the present invention, which is a program in accordance with the first program, causes the computer to issue a partition reconfiguration instruction based on the pre-defined schedule information; and, in response to a notification from an operating system notifying that an operation state thereof has been changed to a partition re-configurable state in which a usual operation state is stopped to make reconfiguration possible, configure a partition according to information on components constituting the partition included in the instruction and, at the same time, change the operation state of the operating system to the usual operation state.

A third program according to the present invention, which is a program in accordance with the second program, causes the computer, when issuing a partition reconfiguration instruction, to periodically obtain, from partition reconfiguration schedule means for including at least date/time information indicating a date and time on which each partition is to be reconfigured and component information indicating information on components constituting the partition, the date/time information and the component information; compare the obtained date/time information with a current date/time and judge that a partition should be reconfigured if there is a matching date/time entry; and issue a partition reconfiguration instruction based on the corresponding component information.

A fourth program according to the present invention is a program in accordance with the third program, wherein, when issuing a partition reconfiguration instruction, the program causes the computer to periodically obtain the date/time information and the component information from the partition reconfiguration schedule means that further includes load information including at least information on a CPU usage rate and an I/O load for each partition configuration, the load information being collected from the operating system after reconfiguration; compare the obtained date/time information with the current date/time and judge that a partition should be reconfigured if there is a matching entry; and issue the partition reconfiguration instruction after adding components to the components indicated by the component information if the load information on a partition, whose component information is the same or similar to the component information on the partition to be reconfigured, indicates a heavy load or after reducing components from the components included in the component information if the load information indicates a light load.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

Here, it should be noted that like reference numerals represent like elements throughout the disclosure.

DETAILED DESCRIPTION OF THE PREFERRED EMBODIMENTS

The present invention will be described in detail by referring to the attached drawings.

First, a first embodiment of the present invention will be described in detail below.

Figure 1:
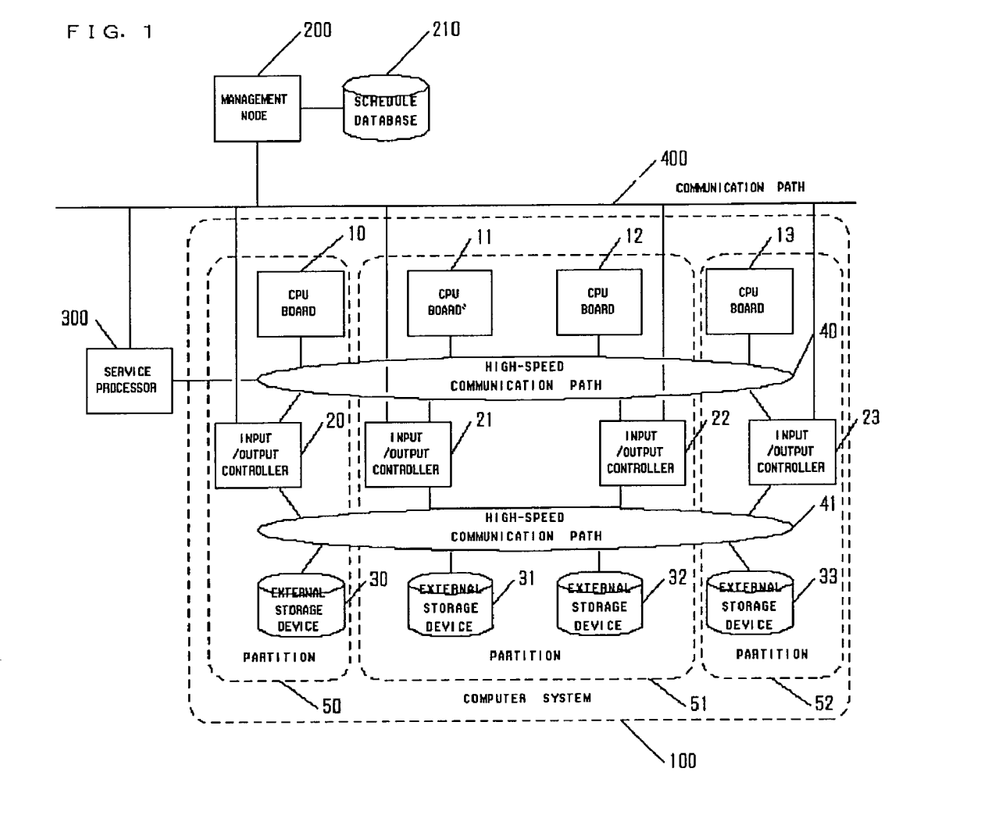
FIG. 1 is a block diagram showing the configuration of a first embodiment of the present invention.

Referring to FIG. 1, the first embodiment of the present invention comprises a computer system 100, a management node 200, and a service processor 300.

Those components, which operate under program control, are interconnected via a communication network 400.

The computer system 100 comprises CPU boards 10, 11, 12, and 13, input/output controllers 20, 21, 22, and 23, external storage devices 30, 31, 32, and 33, and high-speed communication paths 40 and 41.

To the management node 200, a schedule database 210 is connected.

The schedule database 210 contains partition reconfiguration schedules. A partition reconfiguration schedule includes date/time information indicating the date and time of partition reconfiguration, a partition number identifying a partition, and component information indicating information on the computer resources of a partition after the partition is reconfigured (see FIG. 2).

The management node 200 references partition reconfiguration schedules stored in the schedule database 210 and/or adds partition reconfiguration schedules to the schedule database 210. More specifically, the management node 200 periodically obtains partition reconfiguration schedules from the schedule database 210 to check if a partition should be reconfigured. If the management node 200 finds that the partition should be reconfigured, it issues a partition reconfiguration instruction to the service processor 300 and the corresponding operating system.

The service processor 300 receives a partition reconfiguration instruction from the management node 200 and, at the same time, a notification from an operating system indicating that the operating system has moved to the partition re-configurable state. In response to the instruction from the management node 200, the service processor 300 configures partitions by combining some of the CPU boards 10, 11, 12, and 13, the input/output controllers 20, 21, 22, and 23, and external storage devices 30, 31, 32, and 33. Normally, the operating system is stored in the external storage devices 30, 31, 32, and 33, and the operating system stored in an external storage device corresponding to a partition operates in that partition.

Next, with reference to FIGS. 1–6, the general operation of the embodiment will be described in detail.

Figure 3:
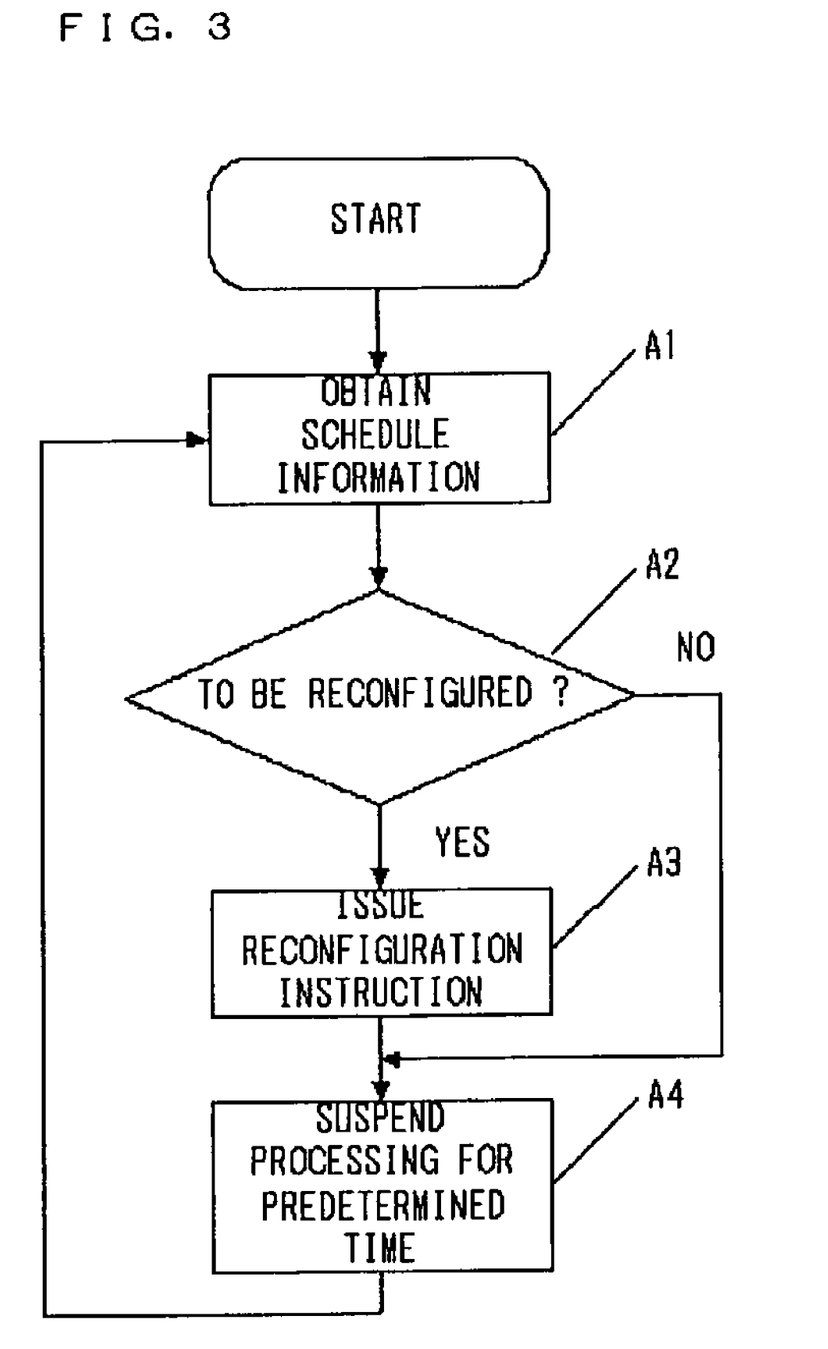
FIG. 3 is a flowchart showing the operation of the first embodiment of the present invention.

First, the management node 200 obtains partition reconfiguration schedules stored in the schedule database 210 (step A1).

Next, the management node 200 compares the current date/time with the date/time information included in the partition reconfiguration schedules to check if there is a matching entry (step A2).

If there is a matching entry, the management node 200 issues a partition reconfiguration instruction to the operating system operating in the configuration indicated by the component information corresponding to the matching date/time information entry and to the service processor 300 (step A3). After issuing the partition reconfiguration instruction, or if there is no matching entry, the management node 200 suspends processing for a predetermined period of time and returns control to step A1 to continue processing (step A4).

Figure 4:
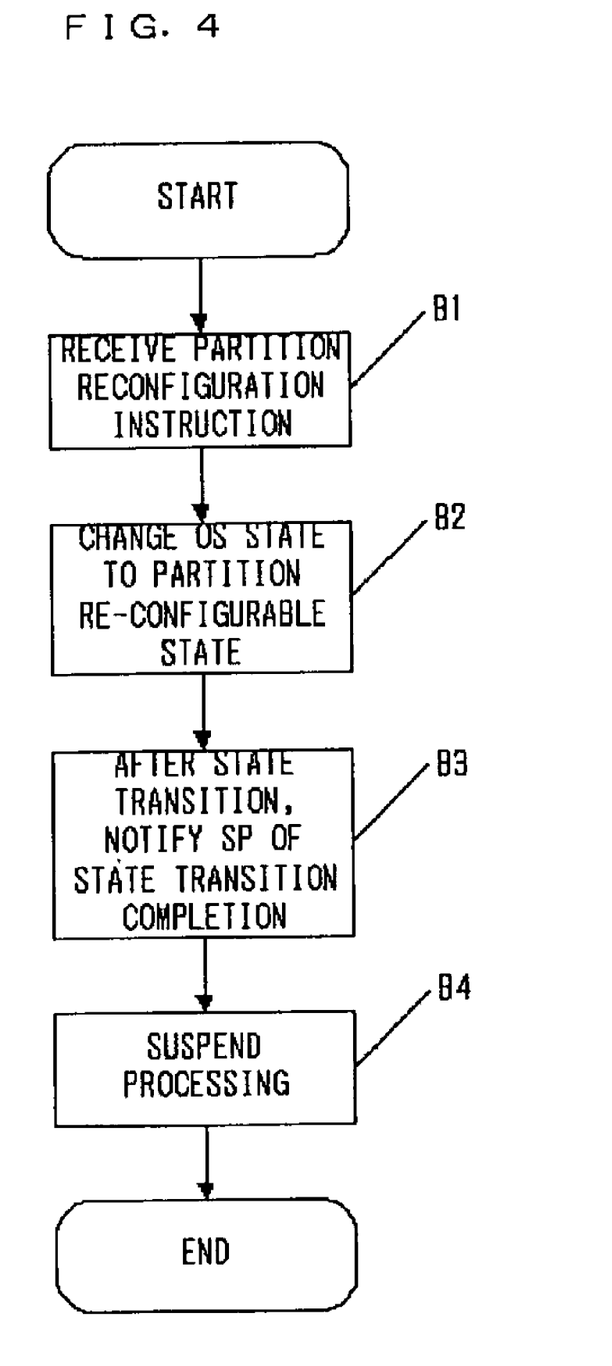
FIG. 4 is a flowchart showing the operation of the first embodiment of the present invention.

In response to the partition reconfiguration instruction from the management node 200 (step B1), the operating system stops the normal operation state and changes its own state to a partition re-configurable state in which the partition may be reconfigured (step B2). After completing the state transition, the operating system notifies the service processor 300 of the completion of the state transition (step B3) and suspends processing (step B4).

Figure 5:
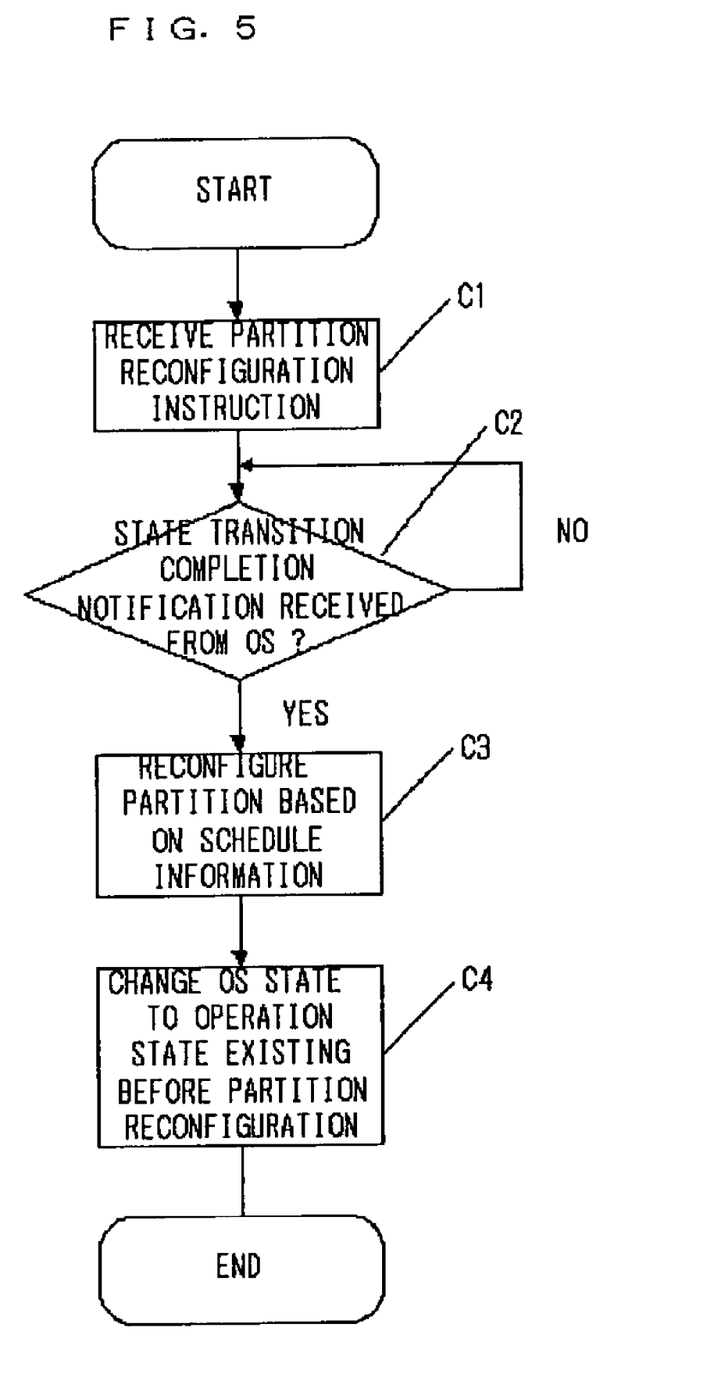
FIG. 5 is a flowchart showing the operation of the first embodiment of the present invention.

On the other hand, in response to the partition reconfiguration instruction from the management node 200 (step C1), the service processor 300 waits for the operating system to enter the partition re-configurable state (step C2) and, when a state transition completion notification is received from the operating system, reconfigures the partition based on the partition reconfiguration instruction from the management node 200 (step C3).

After reconfiguring the partition, the service processor 300 changes the operating state of the operating system to the usual operation state existing before partition reconfiguration (step C4).

Next, the embodiment will be described using an example.

Figure 2:
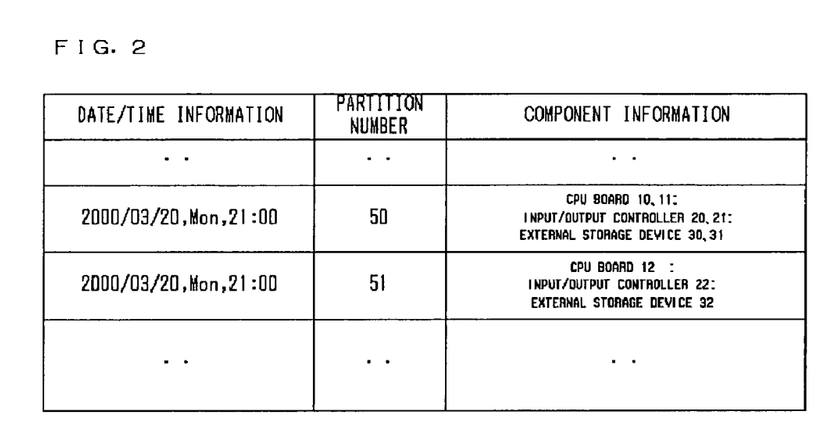
FIG. 2 is an example of the first embodiment of the present invention.

First, the management node 200 obtains the partition reconfiguration schedules stored in the schedule database 210 (step A1, See FIG. 2).

Next, the management node 200 compares the date/time information included in the partition reconfiguration schedules with the current date/time to check if there is a matching entry (step A2).

If the current date/time is 21:00 on Mar. 20 (Monday), 2000, there is a matching date/time information entry in the partition reconfiguration schedules. Thus, the management node 200 issues a partition reconfiguration instruction to the operating system that will operate in the configuration included in the corresponding component information and, at the same time, notifies the service processor 300 of the partition reconfiguration instruction as well as the partition component information (step A3).

In response to the partition reconfiguration instruction from the management node 200 (step C1), the service processor 300 waits for the operating systems to change its state to the partition re-configurable state (step C2).

On the other hand, in response to the partition reconfiguration instruction from the management node 200 (step B1), the operating system changes its state to the partition re-configurable state (step B2). After completing the state transition, the operating system notifies the service processor 300 of the state transition has been done (step B3), and suspends processing (step B4).

Figure 6:
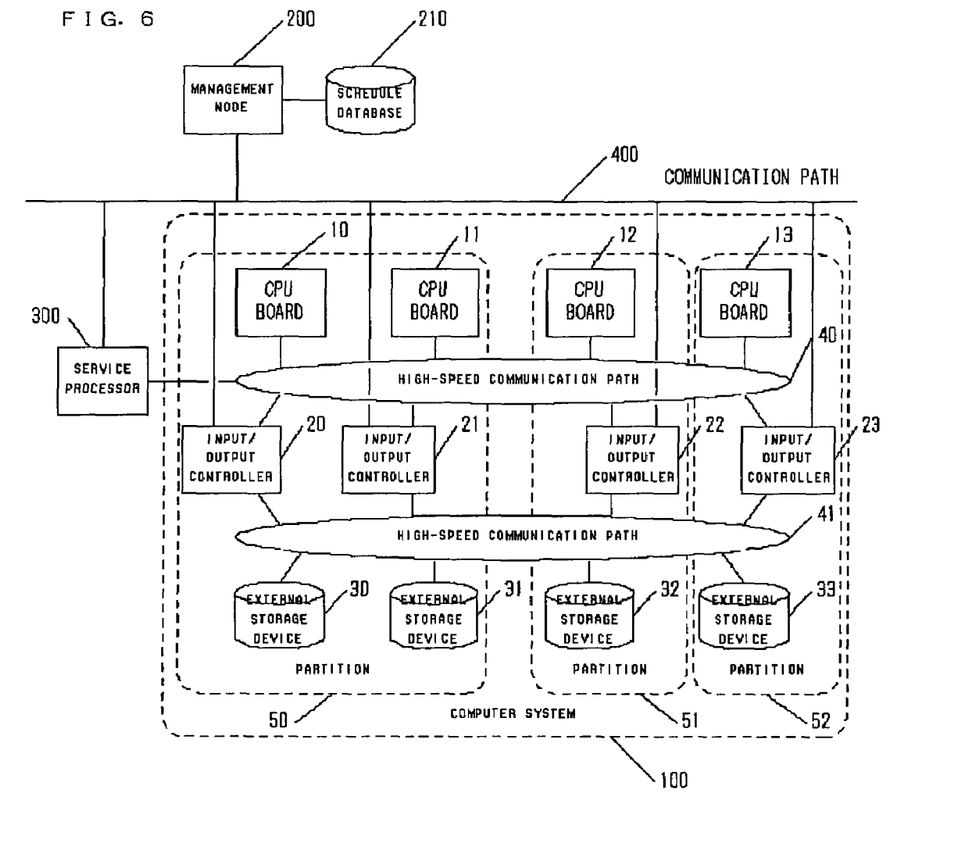
FIG. 6 is a block diagram showing the configuration of a second embodiment of the present invention.

In response to the state transition information from the operating system, the service processor 300 reconfigures the partition based on the partition reconfiguration information notified by the management node 200 (step C3, see FIG. 6).

Finally, after reconfiguring the partition, the service processor 300 changes the operation state of the operating system to the usual operation state existing before partition reconfiguration (step C4).

Next, with reference to the drawings, a second embodiment of the present invention will be described in detail.

Figure 7:
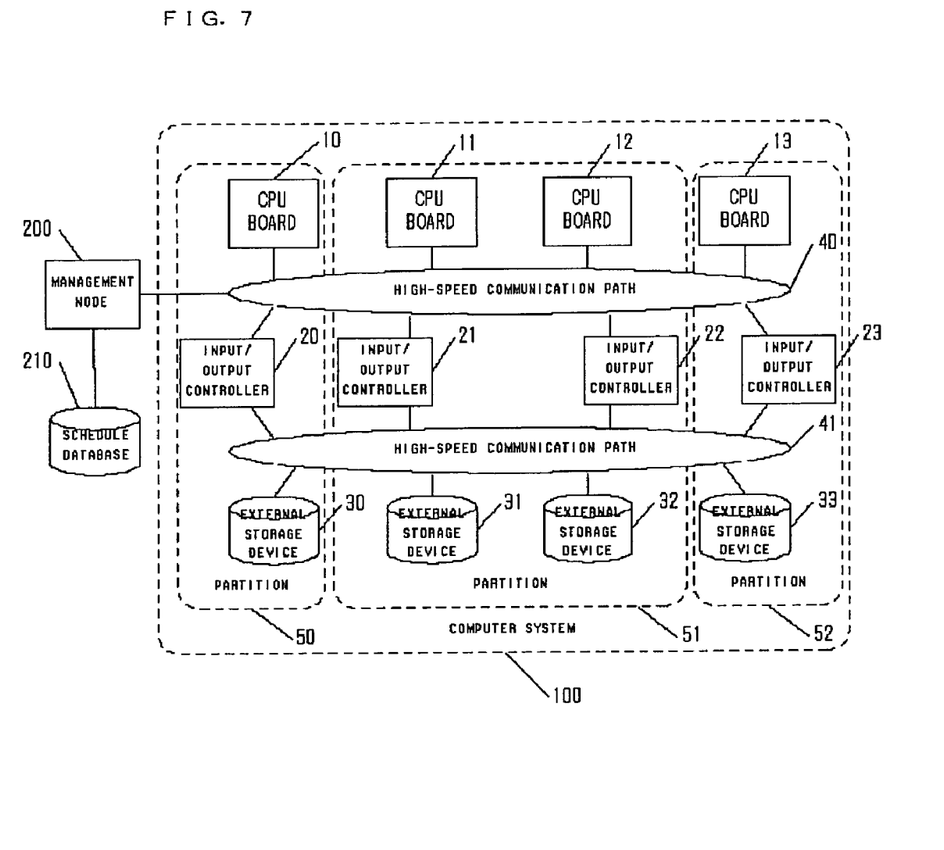
FIG. 7 is a block diagram showing the configuration of the second embodiment of the present invention.

Referring to FIG. 7, the second embodiment of the present invention comprises a management node 200, a schedule database 210, and a computer system 100 that comprises CPU boards 10, 11, 12, and 13, input/output controllers 20, 21, 22, and 23, and external storage devices 30, 31, 32, and 33. The second embodiment differs from the first embodiment in that there is no service processor 300 and that the management node 200 is connected to a high-speed communication path 40 for managing the partition configuration. All partition configuration management functions of the service processor 300 shown in FIG. 1 are included in the management node 200.

The management node 200 is able to reference partition reconfiguration schedules stored in the schedule database 210 and/or add partition reconfiguration schedules to the schedule database 210. In addition, the management node 200 periodically obtains partition reconfiguration schedules to check if the partitions should be reconfigured. Upon detecting that the partitions should be reconfigured, the management node 200 issues a partition reconfiguration instruction to the corresponding operating system via the high-speed communication path 40. In addition, the management node 200 receives from the operating system an notification indicating that it has entered the partition re-configurable state.

With reference to FIGS. 7–10, the general operation of this embodiment will be described in detail.

Figure 8:
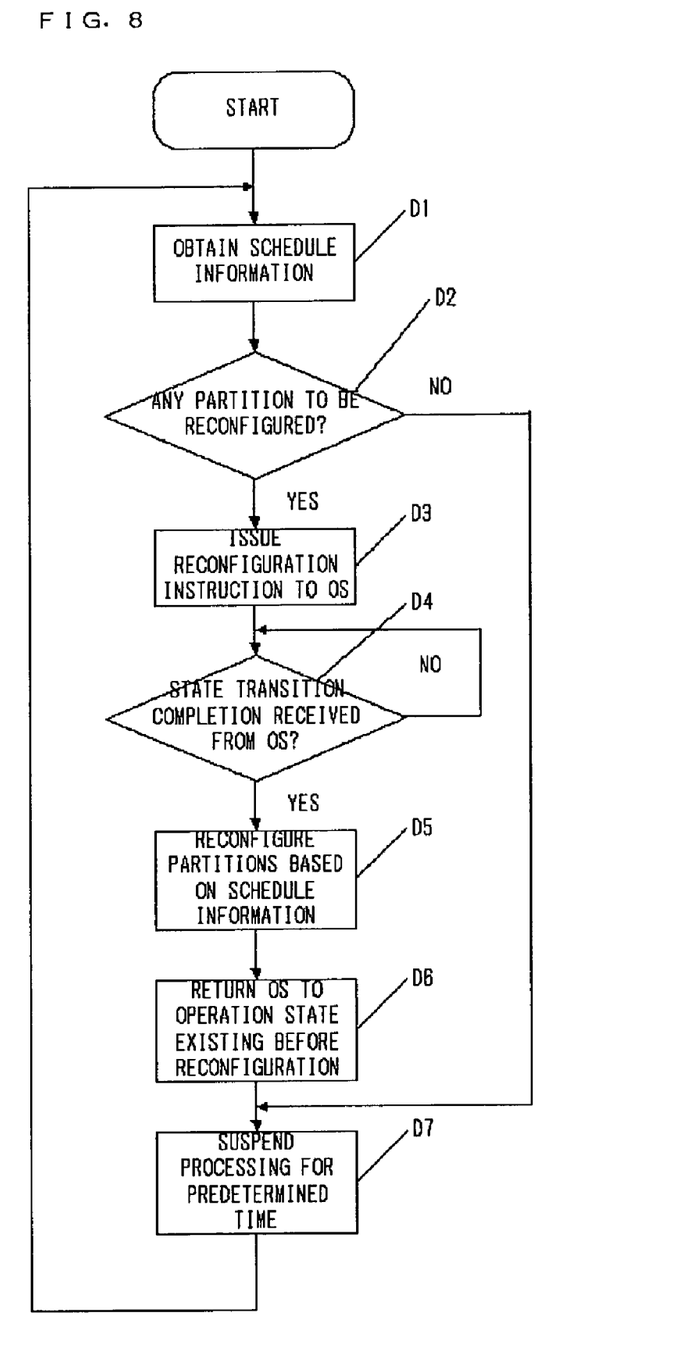
FIG. 8 is a flowchart showing the operation of the second embodiment of the present invention.

First, the management node 200 obtains partition reconfiguration schedules stored in the schedule database 210 (step D1).

Next, the management node 200 compares the current time with time/date information included in the partition reconfiguration schedules to check if there is a matching entry (step D2).

If there is a matching entry, the management node 200 issues a partition reconfiguration instruction to the operating system operating in the configuration indicated by the component information corresponding to the matching date/time information entry (step D3) and waits for the operating system to enter the partition re-configurable state (step D4).

If no date/time information matches the current date/time, the management node 200 suspends processing for a predetermined time and returns control to step D1 to continue processing (step D7).

Figure 9:
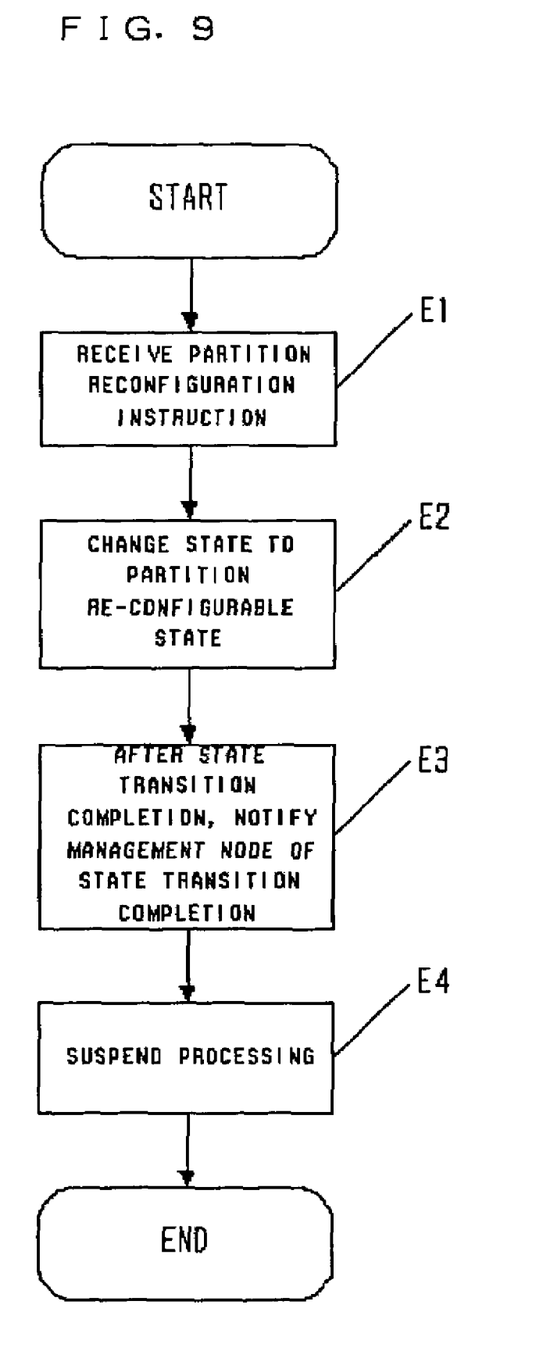
FIG. 9 is a flowchart showing the operation of the second embodiment of the present invention.

On the other hand, in response to the partition reconfiguration instruction from the management node 200 (step E1), the operating system changes its state to the partition re-configurable state (step E2) and, after completion of state transition, notifies the management node 200 of the completion of state transition (step E3) and suspends processing (step E4).

Upon receiving the state transition completion notification from the operating system (step D4), the management node 200 reconfigures the partition based on the partition reconfiguration schedule (step D5). After partition reconfiguration, the management node 200 changes the state of the operating system to the usual operation state existing before partition reconfiguration (step D6).

Next, the embodiment will be described using an example.

First, the management node 200 obtains partition reconfiguration schedules stored in the schedule database 210 (step D1, see FIG. 2).

Next, the management node 200 compares the date/time information included in the partition reconfiguration schedules with the current date/time to check if there is a matching entry (step D2).

When the current date/time is 21:00 on Mar. 20th (Monday), 2000, there is a matching date/time information entry in the partition reconfiguration schedules. Thus, the management node 200 issues a partition reconfiguration instruction to the operating system operating in the configuration indicated by the corresponding component information (step D3) and waits for the operating system to enter the partition re-configurable state (step D4).

On the other hand, in response to the partition reconfiguration instruction from the management node 200 (step E1), the operating system changes its state to the partition re-configurable state (step E2) and, after the completion of state transition, notifies the management node 200 of the completion of state transition (step E3) and suspends processing (step E4).

Figure 10:
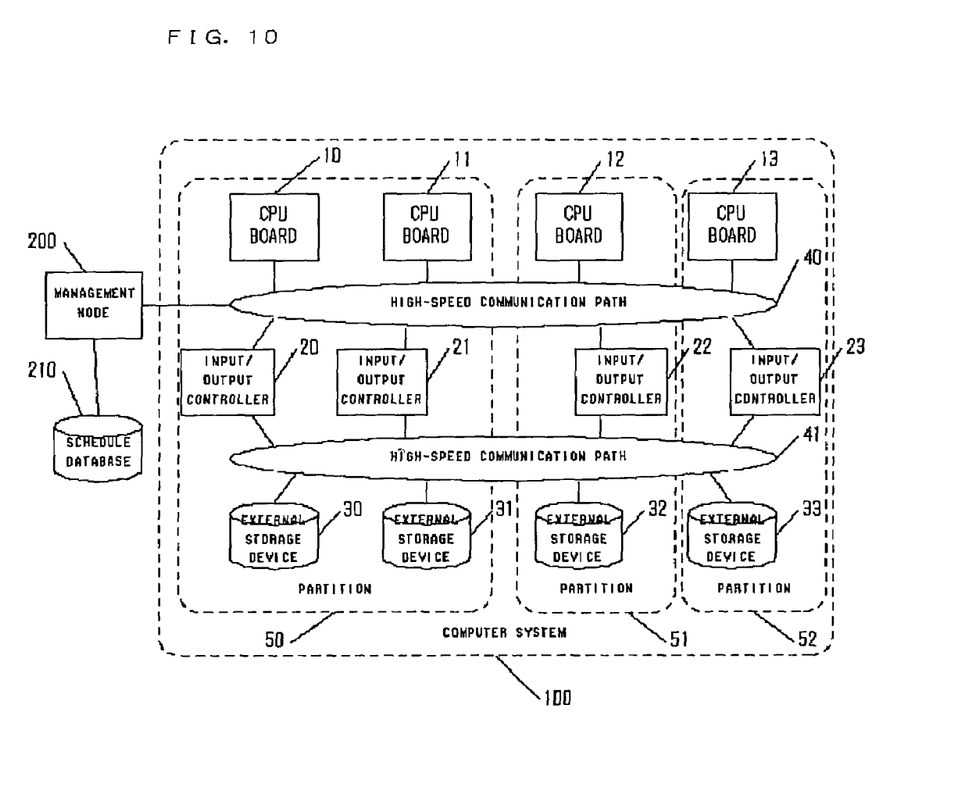
FIG. 10 is a block diagram showing the configuration of the second embodiment of the present invention.

Upon receiving the state transition notification from the operating system, the management node 200 reconfigures the partition based on the contents of the partition reconfiguration information (step D5, FIG. 10).

Finally, after the partition reconfiguration, the management node 200 changes the operation state of the operating system to the usual operation state existing before partition reconfiguration (step D6).

Next, a third embodiment of the present invention will be described in detail with reference to the drawings.

Figure 11:
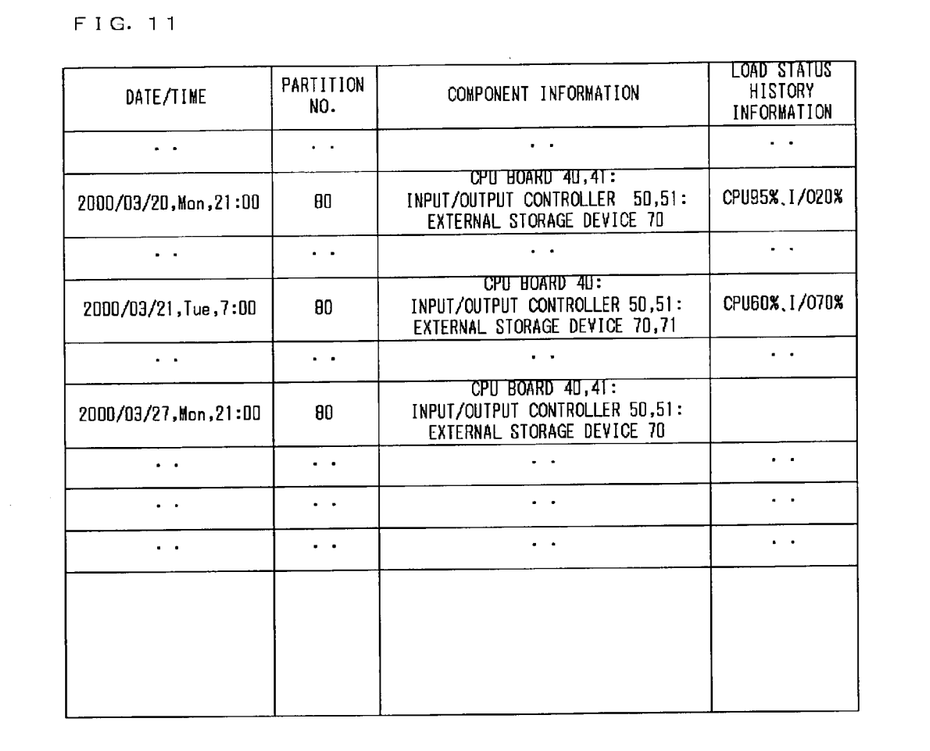
FIG. 11 is an example of a third embodiment of the present invention.

Referring to FIG. 11, the partition reconfiguration schedules stored in a schedule database 210 in the third embodiment include load status history information.

The load status history information includes information on the CPU usage rate and the I/O load of each partition collected by the corresponding operating system after reconfiguration.

A management node 200 periodically obtains partition reconfiguration schedules from the schedule database 210 to check if the component information of the partition to be reconfigured is valid. For example, if the past history includes a partition configuration whose components are the same as or similar to those of the partition that will be reconfigured and if the load of the partition included in the past history is found extremely high, the components are extended. For example, one or more CPU boards are additionally allocated to create a partition configuration compatible with an estimated high load.

Similarly, if the past history includes a partition configuration whose components are the same or similar to those of the partition that will be reconfigured and if the load of the partition included in the history is found light, the components are reduced to efficiently use the partition components.

In the example of partition reconfiguration schedules shown in FIG. 11, the component information for "Mar. 27, 2000, Mon, 21:00" is the same as that for "Mar. 20, 2000, Mon, 21:00", and the CPU usage rate in that partition configuration is as high as 95%. Therefore, when configuring a partition for "Mar. 27, 2000, Mon, 21:00", one CPU board is additionally allocated to the partition to which two CPU boards, 40 and 41, are originally allocated as indicated by the component information.

As described above, the present invention has the following effects.

The first effect is that scheduling partition reconfiguration enables partitions to be reconfigured automatically and ensures the efficient use of computer resources.

The reason is that the management node instructs the service processor and an operating system to reconfigure the partition based on the previously created partition reconfiguration schedule and, according to the instruction, the service processor and the operating system reconfigure partitions.

The second effect is that the partitions may be configured according to the loads.

The reason is that load information included in the partition reconfiguration schedules allows the management node to reconfigure partitions based on the load information.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A partition reconfiguration system wherein components constituting a computer system are partitioned based on pre-defined schedule information, comprising:

a management node that issues a partition reconfiguration instruction based on the pre-defined schedule information;

an operating system that, in response to the instruction, changes an operation state thereof to a partition re-configurable state in which a usual operation state is stopped to make reconfiguration possible and, at the same time, notifies that the operation state thereof has been changed, said operating system operating on said computer system; and a service processor that, in response to the notification notifying that the operation state has been changed, configures a partition according to information on components constituting the partition included in the instruction and, at the same time, changes the operation state of said operating system to the usual operation state, further comprising:

partition reconfiguration schedule means for including at least date/time information indicating a date and time on which each partition is to be reconfigured and component information indicating information on components constituting the partition, wherein said management node periodically obtains the date/time information and the component information from said partition reconfiguration schedule means, compares the obtained date/time information with a current date/time, judges that a partition should be reconfigured if there is a matching date/time entry, and issues a partition reconfiguration instruction based on the corresponding component information.

2. The partition reconfiguration system according to claim 1, wherein said partition reconfiguration schedule means further includes load information including at least information on a CPU (Central Processing Unit) usage rate and an I/O (Input/Output) load for each partition configuration, said load information being collected from the operating system after reconfiguration, and wherein said management node periodically obtains the date/time information and the component information from said partition reconfiguration schedule means, compares the obtained date/time information with the current date/time, judges that a partition should be reconfigured if there is a matching entry and, after adding components to the components indicated by said component information if the load information on a partition, whose component information is the same or similar to the component information on the partition to be reconfigured, indicates a heavy load or after reducing components from the components included in the component information if said load information indicates a light load, issues the partition reconfiguration instruction.

3. A partition reconfiguration method for partitioning components constituting a computer system based on pre-defined schedule information, comprising the steps of:

issuing a partition reconfiguration instruction based on the pre-defined schedule information; and in response to a notification from an operating system notifying that an operation state thereof has been changed to a partition re-configurable state in which a usual operation state is stopped to make reconfiguration possible, configuring a partition according to information on components constituting the partition included in the instruction and, at the same time, changing the operation state of said operating system to the usual operation state, wherein said step of issuing a partition reconfiguration instruction comprises the steps of:

from partition reconfiguration schedule means for including at least date/time information indicating a date and time on which each partition is to be reconfigured and component information indicating information on components constituting the partition, periodically obtaining the date/time information and the component information;

comparing the obtained date/time information with a current date/time and judging that a partition should be reconfigured if there is a matching date/time entry; and issuing a partition reconfiguration instruction based on the corresponding component information.

4. The partition reconfiguration system according to claim 3, wherein said step of issuing a partition reconfiguration instruction comprises the steps of:

periodically obtaining the date/time information and the component information from said partition reconfiguration schedule means that further includes load information including at least information on a CPU usage rate and an I/O load for each partition configuration, said load information being collected from the operating system after reconfiguration;

comparing the obtained date/time information with the current date/time and judging that a partition should be reconfigured if there is a matching entry; and issuing the partition reconfiguration instruction after adding components to the components indicated by said component information if the load information on a partition, whose component information is the same or similar to the component information on the partition to be reconfigured, indicates a heavy load or after reducing components from the components included in the component information if said load information indicates a light load.

5. A program implemented as electrical signals, said program causing a computer to partition components constituting a computer system based on pre-defined schedule information, said program causing the computer to:

issue a partition reconfiguration instruction based on the pre-defined schedule information; and in response to a notification from an operating system notifying that an operation state thereof has been changed to a partition re-configurable state in which a usual operation state is stopped to make reconfiguration possible, configure a partition according to information on components constituting the partition included in the instruction and, at the same time, change the operation state of said operating system to the usual operation state, wherein, when issuing a partition reconfiguration instruction, said program causes the computer to:

from partition reconfiguration schedule means for including at least date/time information indicating a date and time on which each partition is to be reconfigured and component information indicating information on components constituting the partition, periodically obtain the date/time information and the component information;

compare the obtained date/time information with a current date/time and judge that a partition should be reconfigured if there is a matching date/time entry; and issue a partition reconfiguration instruction based on the corresponding component information.

6. The program implemented as electrical signals according to claim 5, wherein, when issuing a partition reconfiguration instruction, said program causes the computer to:

periodically obtain the date/time information and the component information from said partition reconfiguration schedule means that further includes load information including at least information on a CPU usage rate and an I/O load for each partition configuration, said load information being collected from the operating system after reconfiguration;

compare the obtained date/time information with the current date/time and judge that a partition should be reconfigured if there is a matching entry; and issue the partition reconfiguration instruction after adding components to the components indicated by said component information if the load information on a partition, whose component information is the same or similar to the component information on the partition to be reconfigured, indicates a heavy load or after reducing components from the components included in the component information if said load information indicates a light load.

* * * * *